(12) United States Patent
Lundgaard et al.

(10) Patent No.: US 11,461,537 B2
(45) Date of Patent: Oct. 4, 2022

(54) SYSTEMS AND METHODS OF DATA AUGMENTATION FOR PRE-TRAINED EMBEDDINGS

(71) Applicant: salesforce.com, inc., San Francisco, CA (US)

(72) Inventors: Keld Lundgaard, Cambridge, MA (US); Cameron Wolfe, Austin, TX (US)

(73) Assignee: Salesforce, Inc., San Francisco, CA (US)

( * ) Notice: Subject to any disclaimer, the term of this patent is extended or adjusted under 35 U.S.C. 154(b) by 387 days.

(21) Appl. No.: 16/827,830

(22) Filed: Mar. 24, 2020

(65) Prior Publication Data

US 2021/0141995 A1     May 13, 2021

Related U.S. Application Data

(60) Provisional application No. 62/967,137, filed on Jan. 29, 2020, provisional application No. 62/934,714, filed on Nov. 13, 2019.

(51) Int. Cl.
| | |
|---|---|
| *G06K 9/00* | (2022.01) |
| *G06F 40/151* | (2020.01) |
| *G06F 17/18* | (2006.01) |
| *G06N 3/08* | (2006.01) |
| *G06K 9/62* | (2022.01) |
| *G06N 20/10* | (2019.01) |

(Continued)

(52) U.S. Cl.
CPC ............ *G06F 40/151* (2020.01); *G06F 17/18* (2013.01); *G06K 9/628* (2013.01); *G06K 9/6256* (2013.01); *G06K 9/6289* (2013.01); *G06N 3/04* (2013.01); *G06N 3/08* (2013.01); *G06N 20/10* (2019.01); *G06N 20/00* (2019.01)

(58) Field of Classification Search
CPC ........ G06F 40/151; G06F 17/18; G06F 40/30; G06K 9/6256; G06K 9/628; G06K 9/6289; G06K 9/6273; G06N 3/04; G06N 3/08; G06N 20/10; G06N 20/00; G06N 3/0454; G06V 10/40; G06V 10/82
See application file for complete search history.

(56) References Cited

U.S. PATENT DOCUMENTS

| | | | |
|---|---|---|---|
| 11,321,580 B1* | 5/2022 | Walczak | G06K 9/6257 |
| 2018/0267997 A1* | 9/2018 | Lin | G06T 11/60 |

(Continued)

*Primary Examiner* — Ping Y Hsieh
(74) *Attorney, Agent, or Firm* — Butzel Long

(57) ABSTRACT

Systems and methods are provided for generating textual embeddings by tokenizing text data and generating vectors to be provided to a transformer system, where the textual embeddings are vector representations of semantic meanings of text that is part of the text data. The vectors may be averaged for every token of the generated textual embeddings and concatenating average output activations of two layers of the transformer system. Image embeddings may be generated with a convolutional neural network (CNN) from image data, wherein the image embeddings are vector representations of the images that are part of the image data. The textual embeddings and image embeddings may be combined to form combined embeddings to be provided to the transformer system.

28 Claims, 10 Drawing Sheets

(51) Int. Cl.
*G06N 3/04* (2006.01)
*G06N 20/00* (2019.01)

(56) References Cited

U.S. PATENT DOCUMENTS

2020/0050667 A1* 2/2020 Lin ................ G06F 16/35
2020/0327445 A1* 10/2020 Yu ................ G06N 20/00

* cited by examiner

SYSTEMS AND METHODS OF DATA AUGMENTATION FOR PRE-TRAINED EMBEDDINGS

CROSS-REFERENCE TO RELATED APPLICATIONS

This application claims priority to U.S. Application Ser. No. 62/934,714, filed Nov. 13, 2019, and U.S. Application Ser. No. 62/967,137, filed Jan. 29, 2020, the disclosure of each are incorporated by reference in their entirety.

BACKGROUND

Current deep learning applications may have difficulty with overfitting, and fail to perform well in real world environments. This is typically due to a lack of alignment between training and testing distributions. Current deep learning models typically have unpredictable performance when running inference on elements of data that have not been seen during training. Models can generalize to unseen elements of data to an extent. Such models typically struggle with performing predictably on elements of data that are severely misaligned from their training data. Such misalignment is typically on data that belongs to a class of data that was never used during training, and was not similar to data used during training. This often leads to a deep learning model making wrong predictions for unseen elements of data. With such current systems, it is typically difficult to determine elements of data on which the model is not performing well.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Figure 1:
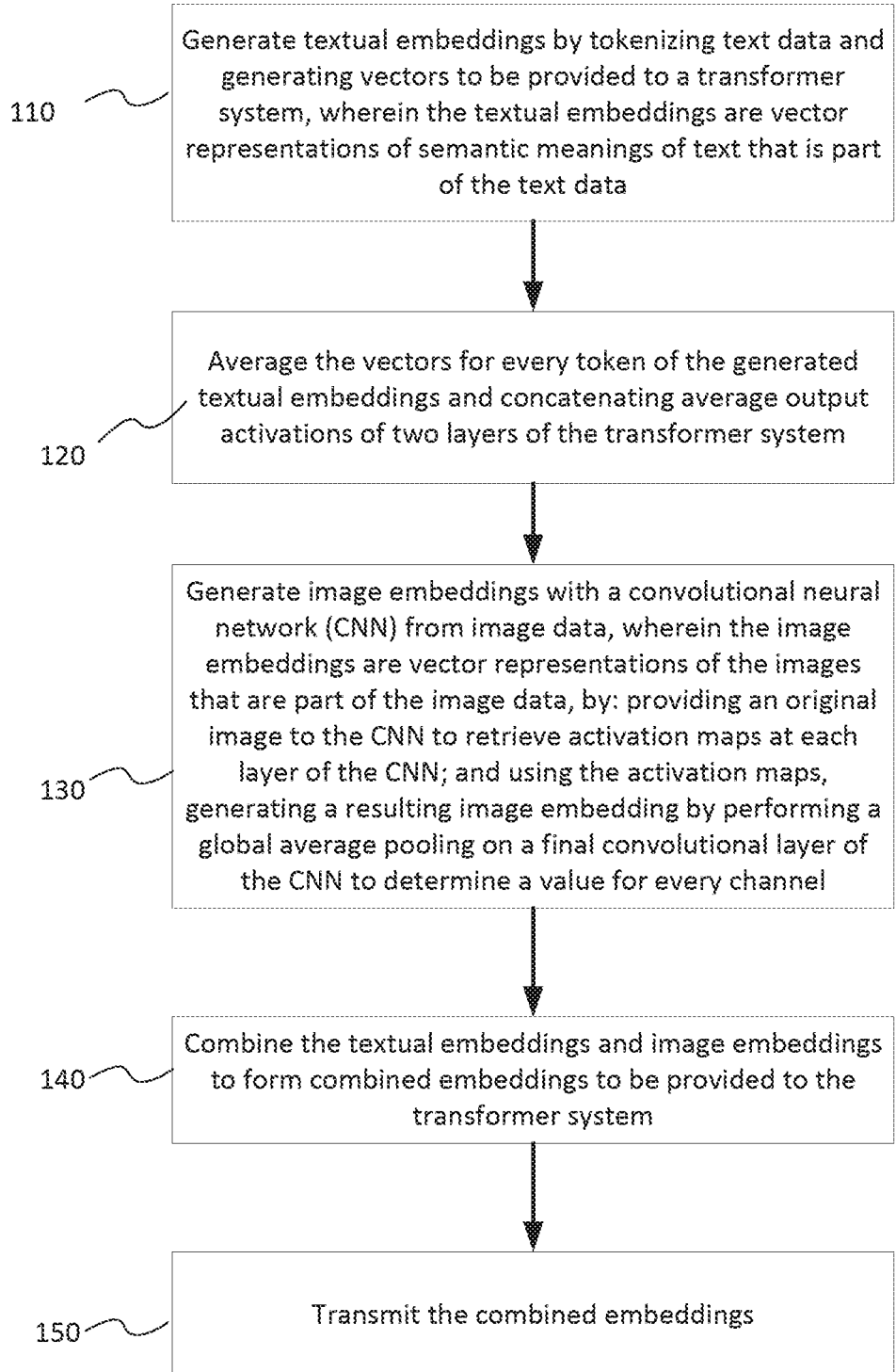
FIG. 1 shows an example method of generating text and/or image data embedding representations according to an implementation of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Implementations of the disclosed subject matter provide system and methods to increase the performance of deep learning with embedding representations, which are representations of text and/or images. Implementations of the disclosed subject matter use large transfer learning models to produce vector embeddings for text and/or image data. A data augmentation may be applied, such as embedding mixup ("E-Mixup"), embedding stitchup ("E-stitchup"), softened embedding mixup ("Soft E-Mixup"), and/or softened embedding stitchup ("soft E-Stitchup") to an input embedding to increase the performance of deep learning models. That is, an embedding augmentation may be applied to a selected input. In some implementations, different types of augmentations may be used during training.

Implementations of the disclosed subject matter may apply weighted averaging and/or weighted pooling between input embeddings. For example, weighted averaging may be applied between two input embeddings. This allows the embeddings from the two or more training samples to be mixed together. The ratio between the two original product classes (e.g., products of an electronic catalog) may be predicted. Implementations of the disclosed subject matter may provide data augmentation for embedding input.

In current deep learning applications, the ability to generalize from one distribution of data (i.e., the training set) to other distributions (e.g., different distributions) is quite difficult. Due to the lack of alignment between training and testing distributions, many deep learning models may have difficulty with overfitting, and fail to perform well in real world environments. This performance discrepancy is typically created by a sampling bias. Such sampling biases are typically created by randomly selecting a set of data to use for training a model. This causes training data to be distributed differently from real-word data. The lack of labeled training data to reduce sampling bias in a training set generally worsens the problem of overfitting. To address issues created by misaligned distributions of training and testing data, methods such as transfer learning, data augmentation, and regularization have been used to mitigate the effects of overfitting.

Current deep learning models typically have unpredictable performance when running inference on elements of data that have not been seen during training. This often leads to the model making overly confident, wrong predictions to such unseen elements of data, or even assigning high confidence to all data elements on which the model is tested, disregarding whether the prediction is correct or not. This issue of overconfidence that arises in deep learning can be detrimental in many cases, due to the fact that wrongly predicted data may become difficult to detect. As a result, it is difficult to pinpoint elements of data on which the model is not performing well. In contrast, the model of implementations of the disclosed subject matter may communicate uncertainty in such situations by assigning low probability to any classification on data about which the model is unsure, thus preventing incorrect classifications and regulating the overconfidence of deep learning models in general.

Overfitting may be reduced using transfer learning. When provided a dataset with very limited training examples, transfer learning may be used to reduce overfitting. For example, in computer vision, large convolutional neural networks (CNNs) that are trained on a pre-training task, such as image classification for ImageNet, have been typically perform well when fine-tuned to accomplish other, downstream tasks. Deep learning models in Natural Language Processing (NLP) can utilize self-supervised learning, in which deep learning models, such as transformers, are trained on large corpora of unlabeled text data and can be fine-tuned to accomplish separate, downstream tasks after pre-training. In general, transfer learning may be useful, due to the alignment of pre-training and downstream tasks that allows the model to transfer knowledge between the two tasks. Instead of directly fine-tuning the weights of such large, pre-trained models, implementations of the disclosed subject matter may use the activation values of the pre-trained model to create vectorized embeddings of data (e.g., where the embedding are textual and/or visual) to be used as input to a model. Such an approach may eliminate the cost of fine-tuning large pre-training models, and may create quality input to maximize the performance of a separate, downstream model. Embedding augmentations of the disclosed subject matter and/or label softening may minimize overfitting and/or overconfidence.

Another way of improving generalization performance is the use of random data augmentation on network inputs. In computer vision, such augmentations typically take the form of either geometric or color augmentations on input images, which may include random horizontal flips, random crops or resizes, color jitter (i.e., randomly perturbing brightness, contrast, saturation, and hue), or the like. These may be effective in improving the generalization performance of computer vision models.

Mixup data augmentation may take a weighted average of two images and tries to predict the weights of each class in the output layer. Mixup may provide improvements to the training of deep networks, such as regularizing the confidence of deep learning models on out of distribution data and reducing overfitting.

Data augmentation has also been applied to NLP tasks. Augmenting textual data is typically difficult compared to augmenting image data. Replacing or changing words within a corpus of text could easily destroy the semantic meaning of a sentence and/or phrase. As a result, few effective data augmentation techniques for NLP have been proposed that are generally applicable to all such tasks.

Current systems have also explored the usefulness of data augmentation in unsupervised domains. The performance of deep learning models may be improved by minimizing the divergence of predictions of original and augmented data that is not labeled, thus smoothing the predictions of the model on out of distribution data.

Implementations of the disclosed subject matter provide new forms of data augmentations, and may be generally applicable to embedding inputs created by pre-trained models.

One of the largest bottlenecks in deploying useful deep learning models may be the lack of sufficient data for supervised learning. Implementations of the disclosed subject matter may improve generalization performance of deep learning models with limited training data. Implementations of the disclosed subject matter may improve the generalization performance of deep learning models by using embeddings generated by larger, pre-trained networks. By using new forms of data augmentation that are generally applicable to such embedding representations, the generalization performance of downstream models that utilize these embeddings as input may be improved. Implementations of the disclosed subject matter provide data augmentations that may regulate overconfidence in downstream models and enable them to identify out of distribution data accurately, thus identifying data to be labeled and identifying performance issues of a model. Implementations of the disclosed subject matter may improve the performance of models that use embeddings as input, thus improving model performance without incurring the cost of fine-tuning any large, pre-trained models. In many cases, fine-tuning of such models is extremely expensive and not feasible for those without adequate computational resources, which may include one or more computers with processors configured to perform such modeling. Such computers may include one or more GPUs (Graphical Processing Units).

Implementations of the disclosed subject matter provide new forms of data augmentation that may be generally applicable to embedding representations of data. These data augmentations for embeddings may be effective in increasing validation performance, improving model calibration, and/or regulating model confidence (i.e., model assigns low confidence on all classes to products it may not classify as well).

Implementations of the disclosed subject matter provide forms of data augmentation that are applicable to embedding representations of data. The data augmentation may be effective in increasing validation performance, calibrating model confidence, and detecting OOD (i.e., out-of-distribution) data. Typically, when pre-trained models are not performing well, fine-tuning the pre-trained model is performed to improve performance. In implementations of the disclosed subject matter, the augmentation methods may improve performance on a downstream task without requiring any fine-tuning or modification of the pre-trained network. Because embedding inputs may be pre-calculated for data (e.g., a portion of data, all data, or the like), the augmentations of the disclosed subject matter may have minimal added cost. The embedding augmentations may be used to optimize the performance of models that use embeddings as input by improving generalization performance, confidence calibration, and/or the ability to accurately detect OOD data.

For both textual and image data, pre-trained deep learning models may be used to produce embedding representations, which quantitatively describe data in the activation space of the pre-trained network. For textual data, transformer architectures such as BERT (Bidirectional Encoder Representations from Transformers) and XLNet may be used to generate embeddings for sentences or phrases. CNNs such as VGG (visual geometry group), Residual Networks (ResNets), or EfficientNet may be used to generate image embeddings. Such embeddings may be created by passing the image date and/or textual data as input to a pre-trained model and using hidden layer activations of the network as embeddings. Because the final layers of such models generally contain high-level, semantic information about the input data, embedding vectors may be typically taken from the final activation layers of a network. In some implementations, lower-level information from earlier activation layers may be used.

Once these embeddings (e.g., using BERT, XLNet, ResNets, EfficientNet, VGG, and the like) are created, these forms of data augmentation may be applied to the embeddings instead of applying them directly to the input images or text, thus avoiding the retraining of larger transfer learning models by instead focusing on increasing the performance of smaller, downstream models. Because the input embeddings of the disclosed subject matter may be pre-calculated (i.e., calculated once for each image or text corpus and persisted to memory) for training examples in a dataset, they may be efficient. This avoids having to run expensive evaluation on the larger pre-trained transfer learning models. Implementations of the disclosed subject matter optimize the generalization accuracy of downstream deep learning models with minimal training data, thus bolstering the effectiveness of transfer learning.

The data used in training, including both text and image data, may be converted into an associated embedding representation as shown in method 100 of FIG. 1. For textual data, a transformer model (e.g., the BERT transformer model) may be used to create embeddings of sentences and phrases within the training data. The transformer model may be part of a transformer system, which may be provided, for example, by device 500, central component 600, and/or second computer 700 shown in FIG. 9. To create these embeddings, input phrases may be tokenized (e.g., using a WordPiece tokenizer), and the resulting tokens may be provided to the transformer model. That is, at operation 110, a server (e.g., device 500, central component 600, and/or second computer 700 shown in FIG. 9) may generate textual embeddings by tokenizing text data and generating vectors to be provided to a transformer system, where the textual embeddings are vector representations of semantic meanings of text that is part of the text data.

When the input tokens are provided to the transformer model, the embedding may be created by averaging the associated output vectors for every token and concatenating these average output activations of two layers of the model. In particular, at operation 120, the server may average the vectors for every token of the generated textual embeddings and concatenating average output activations of two layers of the transformer system. For example, the averaging and concatenating may result in a vector with 1536 elements to represent each textual phrase. If there are multiple phrases associated with a single data element (e.g., a product on an e-commerce site may have both a product title and description), the text embeddings may be created separately for each of these phrases. The separate embeddings may be concatenated together when passed as input to the classification model (e.g., which may be provided by device 500, central component 600, and/or second computer 700 shown in FIG. 9).

In addition to textual data, mixup methods on image embeddings may be used. As described above, these image embeddings may be created with a CNN, which may be, for example, EfficientNet, ResNet, and/or VGG. To create the embeddings, the original image may be passed into the CNN to retrieve the activation maps at each layer of the CNN. In operation 130, image embeddings may be generated by the server with the CNN from image data. The image embeddings may be vector representations of the images that are part of the image data. The image embeddings may be generated by providing an original image to the CNN to retrieve activation maps at each layer of the CNN. By using the activation maps, the server may generate a resulting image embedding by performing a global average pooling on a convolutional layer of the CNN to determine a value for every channel. For example, convolutional layer may be a final convolutional layer, and/or one or more layers that precede the final convolutional layer.

From the activation maps, the resulting image embedding may be created by performing a global average pooling on one or more of the convolutional layers of the network (e.g., the final convolutional layer, and/or one or more earlier convolutional layers). In some implementations, this may yield a single value for every channel. For example, performing a global average pooling on the final convolutional layer may result in a vector with 1792 elements to represent each image.

Figure 9:
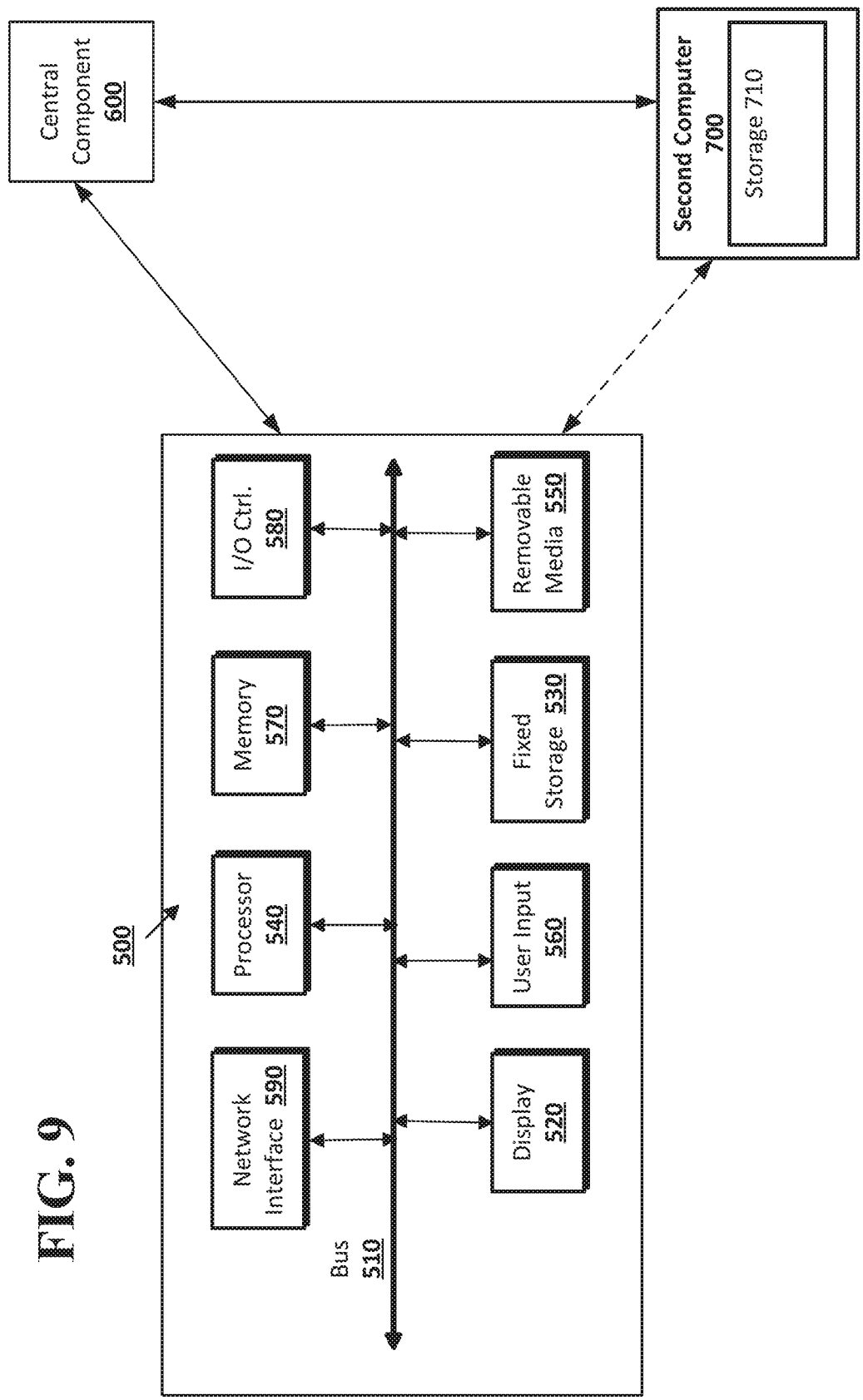
FIG. 9 shows a computer system according to an implementation of the disclosed subject matter.

The image and textual data may be combined by the server at operation 140, and may be classified (e.g., by the classification model, which may be provided by device 500, central component 600, and/or second computer 700 shown in FIG. 9). Tests may be performed with textual embeddings, image embeddings, and/or combined textual and image embeddings. Similarly to handling cases in which embeddings for multiple textual phrases are available, image and/or textual embeddings may be combined by concatenating them with each other to create a single vector. The combined embeddings to be provided to the transformer system by transmitting the combined embedding at operation 150. In some implementations, the server may combine concatenate the textual embeddings and image embeddings with each other to create a single vector, and classify the combined embeddings. In some implementations, the server may apply weighted averaging and/or average pooling to at least one of the textual embeddings and the image embeddings.

The server may apply at least one data augmentation which may include at least one of an embedding mixup (E-Mixup), embedding stitchup (E-Stitchup), softened embedding mixup (Soft E-Mixup), and/or softened embedding stitchup (Soft E-Stitchup).

The first form of data augmentation used in implementations of the disclosed subject matter is referred to as embedding mixup ("E-Mixup"). This form of data augmentation takes the weighted average of the embedding inputs for two separate input examples. That is, the server may generate a weighted average of embedding inputs for two separate inputs that may be selected from the textual embeddings and/or the image embeddings.

Figure 2:
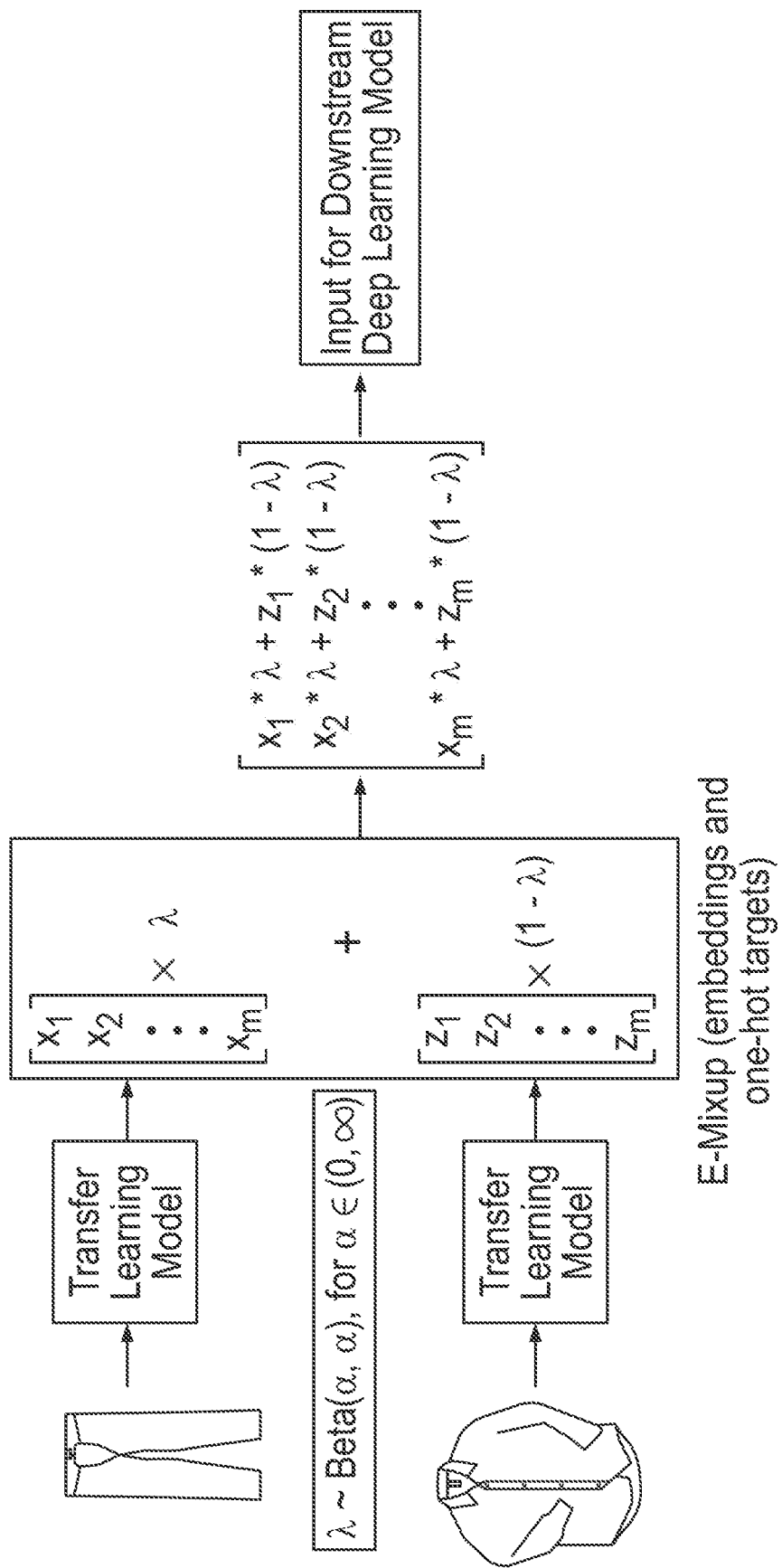
FIG. 2 shows embedding representations that are augmented using embedding mixup ("E-Mixup") according to an implementation of the disclosed subject matter.

With embedding mixup, two input embeddings may be combined by first sampling a random value, lambda ($\lambda$), from a Beta distribution having a parameter alpha ($\alpha$), as shown in FIG. 2. As used throughout, alpha may refer to a distribution parameter, as opposed to a learning rate. Once lambda has been sampled, embedding mixup may determine a weighted average over the embedding inputs of two unique training examples, where lambda may be the weight of the average. Each time two inputs are combined, a new lambda value may be sampled, thus randomly perturbing each sample that is passed as input to the model. The process of combining two input embeddings using embedding mixup is shown in FIG. 2.

Embedding mixup may be applied to both input embeddings and their associated target vectors. The resulting target vector after the embedding mixup is applied is a weighted average of the two original target vectors, using the same weight of the combined input examples. For one-hot target vectors, this operation will result in two classes with positive probability in the target output distribution. One-hot target vectors may be formed from a group of bits among which the legal combinations of values are those with a single high value (e.g., a 1 bit) and all the others low (e.g., a 0 bit).

In some implementations, for a pair of two unique training examples, embedding mixup may be performed both on the input embeddings and on the labels that may be predicted for the training examples with the same randomly sampled weight. This may soften the target labels that are being predicted by the model with the mixed input embeddings. Embedding mixup may regularize the smaller, downstream network and may optimize its performance without having to fine-tuning any large transfer learning models.

Figure 3:
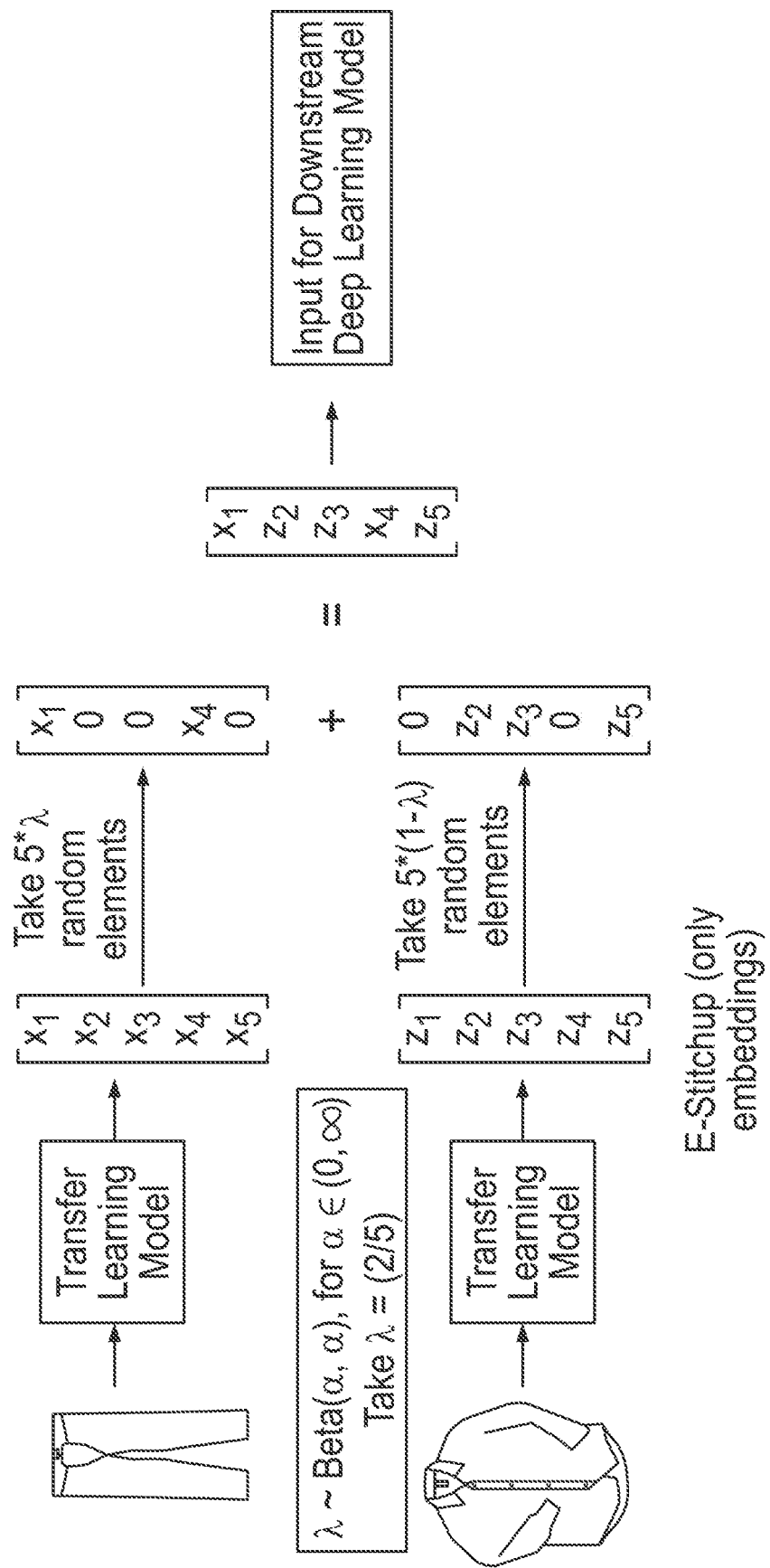
FIG. 3 shows embedding representations that are augmented using embedding stitchup ("E-stitchup") according to an implementation of the disclosed subject matter.

The second form of data augmentation used in implementations of the disclosed subject matter may be referred to as embedding stitchup, which may create a combination of two unique training examples. Instead of taking a weighted average of two embedding inputs, elements from each of the two embedding vectors in embedding stitchup may be randomly sampled to create a combination. The value at each index of the resulting input may be randomly sampled from either of the two original embeddings. Similarly to embedding mixup, the probability of choosing an element from either vector (i.e., the expected ratio of elements to sample from each vector) may be determined by a value, lambda ($\lambda$), that is sampled from a random beta distribution with parameter alpha ($\alpha$). The process of combining two input embeddings with embedding stitchup is shown in FIG. 3. Although embedding stitchup augments the input embeddings differently than embedding mixup, the associated label vectors may be handled the same as with embedding mixup, by taking a weighted average of the two original target vectors. This data augmentation may be generally applicable to embedding representations, and may improve performance by regularizing downstream models instead of the large transfer learning models.

In some implementations of the embedding stitchup, the server may generate a combination of two unique training examples by randomly sample elements from two vectors, which may include the vectors of the text and/or the vectors of the images. The server may generate a weighted average of two label vectors of the vectors of the text, where the label vectors are textual labels of items. The embedding stitchup may randomly sample a ratio of each embedding.

Although embedding stitchup applies a different augmentation to the input embedding, the associated label vectors may be handled in the same manner as in embedding mixup. That is, embedding stitchup may take the weighted average of the two label vectors. This form of data augmentation may have the benefit of avoiding the prediction of one-hot labels (described below) and, instead, may predict the ratio between the two classes that are mixed. That is, in some implementations, the server may predict a ratio between at least two original product classes of an electronic catalog based on at least a portion of the combined embeddings provided to the transformer system.

One-hot labels may be formed from a group of bits among which the legal combinations of values are those with a single high value (e.g., a 1 bit) and all the others low (e.g., a 0 bit). Embedding stitchup may randomly sample the ratio of each embedding to include in the mixed training example, thus perturbing each training example differently and ensuring that the network may not receive the same input twice, which may have a regularizing effect on the network.

Other forms of data augmentation, which may include soft embedding mixup (Soft E-Mixup) and/or soft embedding stitchup (Soft E-Stitchup) may be performed the same way as the previous methods, but add extra label softening to the resulting target vectors. To soften the target vector, a weighted average of the two original target vectors may be taken, and its values may be randomly perturbed by subtracting a small value from the positive classes (i.e., classes with nonzero probability) and adding a small value to the rest of the negative classes (i.e., classes with zero probability). A total probability of one may be distributed across the negative classes. The amount subtracted from the positive classes, typically 0.1, may be referred to as "Label Softness" and is clamped at zero (i.e., set at zero, and may not be changed) such that may not result in a negative class probability. The target vector may be softened to create a regularizing effect on the network's predictions. In some implementations, the sum of target probabilities across all classes may not be constrained to a value of one due to the use of a binomial out-put transformation instead of softmax. When this extra softening is applied to each of the proposed augmentation methods, they are referred to as soft embedding mixup, and soft embedding stitchup, respectively.

With the soft embedding mixup and soft embedding stitchup, the server may generate a weighted average of two target vectors from at least one of the vectors of text and the vectors of the images to generate a predicted soft target vector. The predicted soft target vector may represent the ratio sampled from each of two input vectors for the transformer system, where the two input vectors may be the vectors of text, and/or the vectors of the images. The server may randomly perturb values of the predicted soft target by having the determined total probability distributed over negative classes equal to one, and by having the amount subtracted from the positive classes The server may normalizing the values added to the one or more negative classes such that the amount subtracted from the two positive classes is equal to the total probability distributed over the negative classes.

The above-described forms of embedding augmentation may be partially evaluated on the ability of resulting models to detect OOD data. In some implementation, OOD data may be identified by applying a threshold to network outputs, referred to as the "Confidence Threshold," such that a prediction may be valid if the model assigns a probability greater than the threshold to a certain class. If multiple classes are given probabilities greater than the confidence threshold, the class with the greatest probability may be selected. If no classes are assigned probabilities greater than the confidence threshold, the data is considered OOD or part of a "none" category. The accurate identification of "none" category data may be related to the problem of confidence calibration. Unlike recent approaches to confidence calibration and identifying OOD data, implementations of the disclosed subject matter may calibrate the outputs of the network directly by incorporating confidence calibration directly into the model's training procedure. The outputs of the network may be interpreted intuitively and used directly to identify OOD data using the confidence threshold.

Once the input vectors are augmented using a selected form of data augmentation (e.g., embedding mixup, embedding stitchup, soft embedding mixup, soft embedding stitchup, or the like), the augmented examples may be provided into the down-stream classification model. This model may be a deep, fully connected network which accepts a fixed size input and outputs a probability distribution for the different classes. The model may include two hidden layers. In some implementations, the model size may be increased or decreased. The model may be trained using a linear, cyclical learning rate for the augmentation methods, where the learning rate may be linearly cycled from a lower to an upper bound linearly throughout training. In order to select a class from the model's output, a binomial output transformation may be applied to the model's output layer, which applies an element-wise sigmoid activation to every element of the activation layer. This binomial activation may be used instead of softmax so that the model is able to have low confidences to all classes. This may reveal that the inputted example may be part of a class that is not within the training distribution of classes. Models trained using softmax output layers may tend to be overly confident when running inference on out of distribution data. In cases where there may be limited training data, the ability to identify unknown inputs has several advantages, including not wrongly predicting data and identifying important data for labeling.

Implementations of the disclosed subject matter may evaluate a model based on its performance in accurately identifying classes of data on which the model is trained, and also evaluate its performance in correctly predicting no classes on items that are outside of the model's training distribution. In order to determine which data does not belong to any class, a confidence threshold may be placed on each of the class probabilities, such that the model assigns a probability greater than the confidence score to assign data to a class. If multiple classes are given probabilities greater than the confidence threshold, the class with the greatest confidence score may be selected (i.e., a single input cannot be assigned to multiple classes). If no classes are assigned probabilities greater than the confidence threshold, the data may be considered to not be a part of any class, which is referred to in this work as the "none" or "dustbin" category. Implementations of the disclosed subject matter may evaluate whether a model is well calibrated.

The following are examples using implementations of the disclosed subject matter with a Fashion Product Images Dataset. Separate experiments were performed to analyze the effect of each proposed data augmentation method (e.g., embedding mixup, embedding stitchup, soft embedding mixup, and/or soft embedding stitchup) on the performance of downstream classification models. Each of the experiments were repeated for ten trials with different training and validation splits. For each of the augmentation methods, settings of hyperparameters (e.g., alpha value, label softness, and the like) were explored using a grid search. The best performing hyperparameters were selected during this grid search and held constant thereafter through each of the trials. A control experiment, which corresponds to an experiment in which no augmentation is used, was conducted in parallel. Parameters and settings for the control experiment, besides the use of embedding augmentation, were the same as those in the other experiments.

In the experiments, a Fashion Product Images dataset was used that includes approximately 44,000 apparel products, each of which has an associated image, product title, and/or product description. These products may be classified into 171 unique categories of products. The textual data associated with each product (i.e., the product title and product description) may be converted into an embedding vector, as described above. The images may be converted into an associated embedding representation following the same procedure. These embeddings, including two text vectors and one image vector, may be concatenated together before being fed as input into a fully connected classification model, and the model may be trained to predict a product's associated class. This dataset was selected so that both textual and image embeddings may be used for classification.

In this example, the BERT transformer model was utilized to create textual embeddings. The implementation utilized the BERT Base model (i.e., HuggingFace PyTorch implementation) to generate the textual embeddings.

To create embeddings, input phrases may be first tokenized as described above (e.g., operation 110 shown in FIG. 1, such as by using a WordPiece tokenizer). The resulting tokens may be converted into token embeddings, and provided as input into the BERT model. The textual embedding may be generated by finding the average output vector of the last two output layers and concatenating them together. In this example, an embedding vector may be generated with 1536 elements to represent a single, textual phrase. If there are multiple phrases associated with a single data element (e.g., an apparel product may have both a product title and description), embeddings may be separately generated for each of these phrases and then concatenated together.

Embeddings for image data in this example were created with the EfficientNet B4 model. After passing the image as input into the CNN model, the resulting image embedding may be generate by performing a global average pooling on the network's final convolutional layer, yielding a single value for every channel of the feature map at this layer. In this example, an embedding vector is generated with 1792 elements to represent each image. In cases where both image and textual data are available, image and textual embeddings may be created separately and concatenated together before being passed as input to the downstream model.

The downstream classification model may be a deep, fully-connected network, which may accept a fixed size input and may output a probability distribution over possible classes. In this example, the model may include two hidden layers of size 250. Each hidden layer of the network, without including the output layer, may be followed by a Dropout layer with probability of 0.3, and a Rectified Linear Unit activation. A binomial output transformation, or an element-wise sigmoid activation, may be applied to the model's output layer before the predicted class is determined. This binomial output transformation may be used instead of softmax so that the model has the ability to assign low probability to all classes, thus enabling the model to handle data that does not belong to a class that was seen during training by assigning low probability to all classes. When limited training data is available, the ability to identify OOD data may be useful, as it can prevent inaccurate predictions and identify useful portions of the dataset to label and include in the model's training set. The downstream model may be smaller than most pre-trained models used for transfer learning, and it may be retrained quickly and at a low computational cost.

For the example experiments, weight decay was set to 0.0001 and a linear learning rate cycle is utilized that fluctuates from a learning rate of 0.0003 to 0.003 with a step size of 12 epochs (i.e., rounds). Training continued for 576 epochs for all experiments. 10% of the available data was used for training (i.e., about 4,400 of the available 44,000 total products), while the rest of the data was used for validation. A small training set was used to simulate a scenario with limited training data. Such a scenario, in general, is when overfitting is most likely and data augmentation may be most useful. Including fewer products in the training set may allow some classes of products to be excluded from the training set, which allows "none" category accuracy (as discussed above) to be evaluated. Each trial of the experiment was performed with a different training and validation split to ensure the consistency of the results.

For the result of this example experiment, accuracy may be the top-one accuracy of class probabilities (i.e., the highest-probability class in the model's output layer is the predicted class). If the prediction confidence is lower than the confidence threshold, the product may be considered to be in the "none" category. Product classes that are not present in the training set, but are present in the validation set, may be considered to be part of the "none" category. In this example, a correct classification occurs when either the top-one prediction, with probability above the confidence threshold, is equal to a product's labeled class, or if no classes are assigned a probability higher than the confidence threshold for a product in the "none" category (i.e., belongs to a class that was not part of the training set).

Figure 4B:
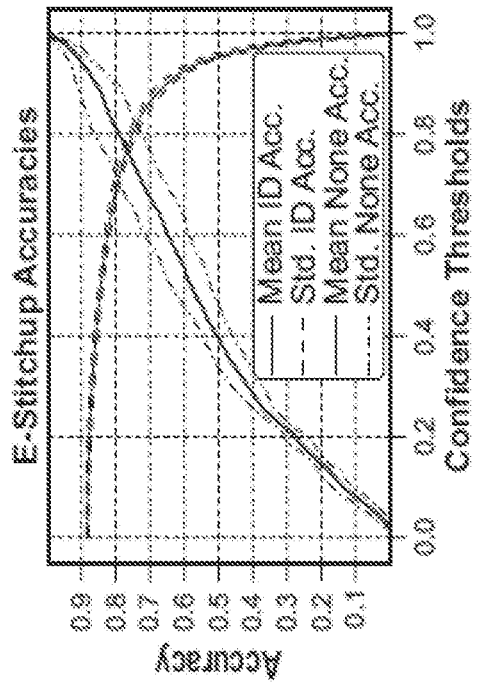
FIGS. 4A-4C show accuracy across different confidence thresholds according to an implementation of the disclosed subject matter.
Figure 4A:
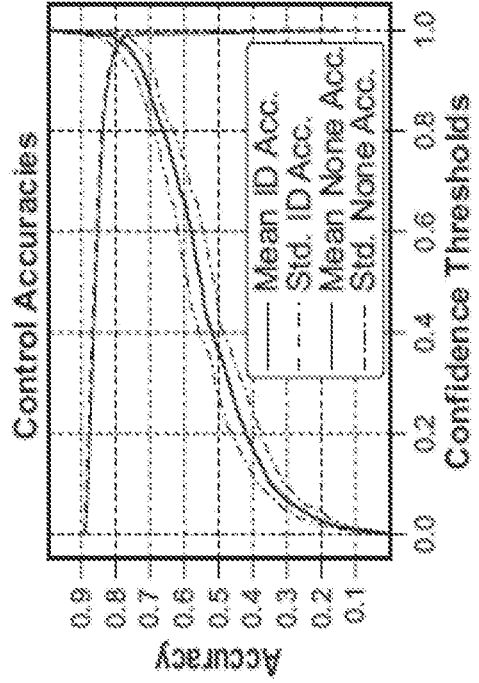
Figure 4C:
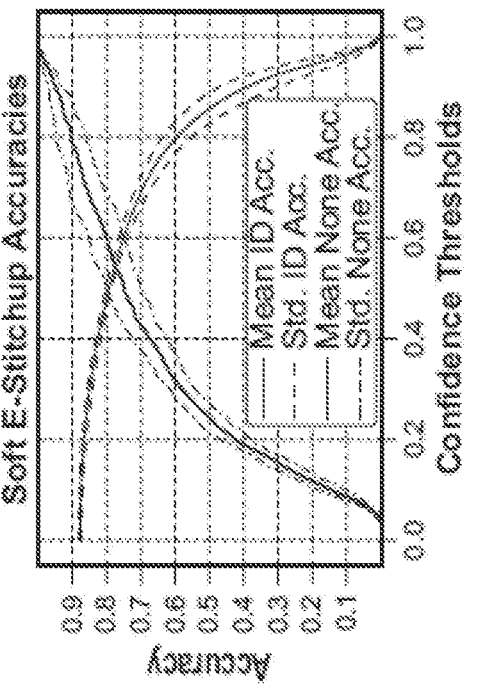

In the example experiments, each of the augmentation types are evaluated. Accuracy metrics for both the "none" category and other product categories are recorded for each of the embedding augmentation methods and compared to the control, as shown in FIGS. 4A-4C. In particular, overall (i.e., products that are not in the "none" category) and "none" category accuracy are shown across different confidence thresholds for a Control experiment shown in FIG. 4A, embedding stitchup (E-Stitchup) in FIG. 4B, and soft embedding stitchup (Soft E-Stitchup) in FIG. 4C. The solid lines in FIGS. 4A-4C represent the average accuracy values across trials, and the dotted lines represent the standard deviation in accuracy across trials. Accuracy metrics may be dependent upon the value of the confidence threshold, raising the need for a threshold-independent evaluation metric. Area Under the Receiver Operating Characteristic Curve (AUROC) and Area Under the Precision-Recall Curve (AUPR) scores are presented to provide evaluation metrics that are independent of the value of the confidence threshold. Model calibration may be assessed by plotting reliability diagrams and measuring the correlation between confidence and accuracy for each model.

Table 1 below shows weighted average AUROC and AUPR scores across all product categories, including the "none" category, for models trained with each of the proposed augmentation methods. The values presented in Table 1 may be all relative to the average AUROC and AUPR score of the control experiment. The deviations listed may represent the standard deviation of a method's relative improvement over the control across all trials. As shown in Table 1, E-Mixup and E-Stitchup, may be embedding mixup and embedding stitchup disclosed throughout. The values shown are all relative to the average AUROC and AUPR score of the Control experiment. The deviations listed next to each value may be the standard deviation of each method's improvement over the Control experiment.

TABLE 1

| Method | AUROC | AUPR |
| --- | --- | --- |
| Control | 0.9698 (0.0010) | 0.8913 (0.0026) |
| Soft Control | +0.0200 (0.0006) | +0.0196 (0.0028) |
| E-Mixup | +0.0173 (0.0014) | +0.0164 (0.0054) |
| E-Stitchup | +0.0189 (0.0007) | +0.0222 (0.0031) |
| Soft E-Mixup | +0.0216 (0.0008) | +0.0228 (0.0022) |
| Soft E-Stitchup | +0.0226 (0.0012) | +0.0236 (0.0020) |

As shown in Table 1, embedding mixup has an improvement of 0.0173 and 0.0164 over the control experiment's AUROC and AUPR score, respectively. From these improvements over the control, embedding mixup has better classification performance for both general product categories and the "none" category. Embedding mixup may have the lowest AUROC and AUPR scores when compared to all other augmentation experiments. If labeled softening is added to embedding mixup (i.e., soft embedding mixup), the resulting model has an improvement of 0.0216 and 0.0228 over the control's AUROC and AUPR scores, respectively. Soft mixup provides improvements in classification performance, and has the highest AUPR score of all of the augmentation types. The improved AUROC and AUPR scores of embedding mixup and soft embedding mixup may be evident in their overall and "none" category accuracies.

To quantitatively demonstrate the improved calibration of models trained with embedding augmentation, the correlation between model accuracy and confidence is measured, as shown in Table 2 below. Models trained with embedding mixup (E-Mixup) and soft embedding mixup (Soft E-Mixup) may yield confidence-accuracy correlations of 0.9789 and 0.9236, while the control experiment yields a correlation of 0.9072.

Figure 6:
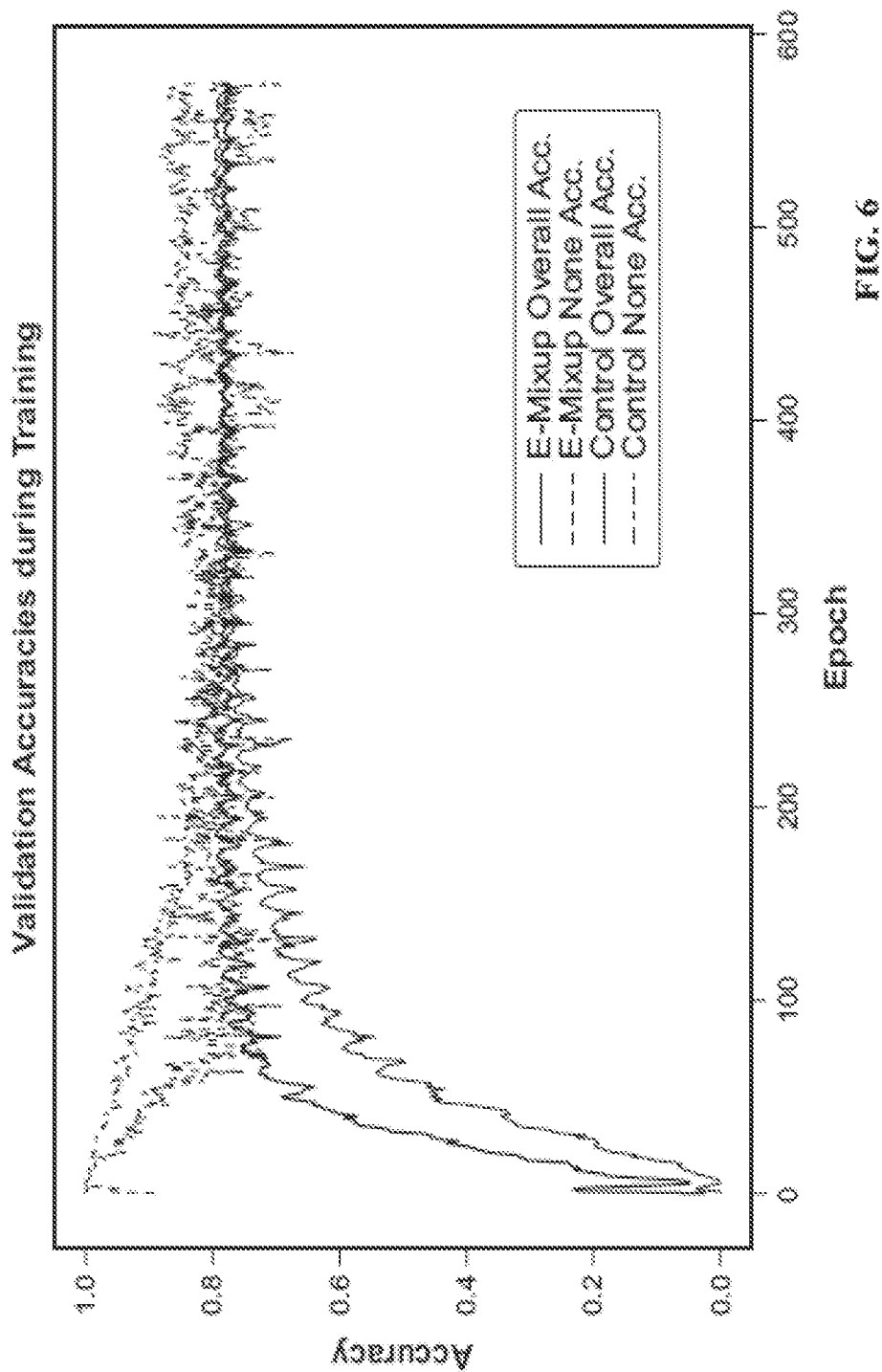
FIG. 6 shows category accuracy throughout training of the control model and the embedding mixup according to implementations of the disclosed subject matter.

As shown in FIG. 6, models trained with E-Mixup may converge in half the number of epochs compared to the control and maintain a stable "none" category accuracy throughout later epochs in training, allowing accurate and consistent classification of OOD data. Faster convergence and stable "none" category accuracy, although demonstrated with E-Mixup in FIG. 6, may be common characteristics of models trained with all forms of embedding augmentation. Models trained without embedding augmentation (i.e., both control and soft control experiments) tend to have volatile "none" category accuracy that deteriorates through-out training and take significantly longer to converge.

FIGS. 4A-4C show in-distribution (i.e., all products that are not in the "none" category) and "none" category accuracy across different confidence thresholds for the control experiment (FIG. 4A), embedding stitchup (E-Stitchup, FIG. 4B), and soft embedding stitchup (Soft E-Stitchup, FIG. 4C). The solid lines in FIGS. 4A-4C may represent average accuracy across all trials, while the dotted lines in these figures may represent the standard deviation in accuracy between trials.

As shown in Table 1, embedding stitchup provides an improvement of 0.0189 and 0.0222 in AUROC and AUPR score over the control, respectively. Additionally, soft embedding stitchup yields an improvement of 0.0226 and 0.0236 in AUROC and AUPR score over the control, respectively. As with embedding mixup, the softened version of embedding stitchup yields further benefits in classification performance, and both methods yield an improvement over the performance of the control.

Figure 5B:
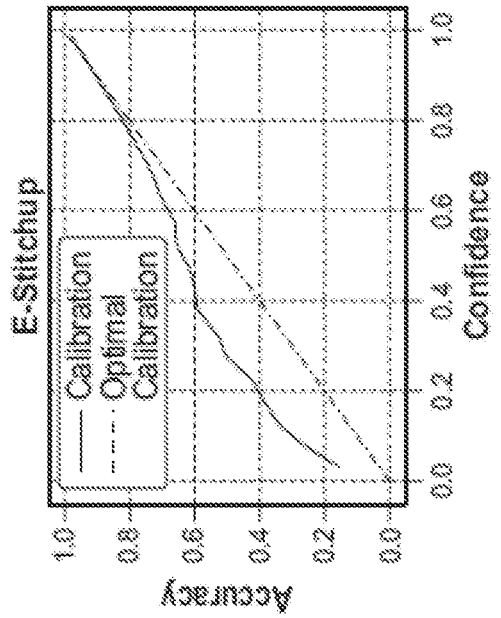
FIGS. 5A-5C show reliability for models trained in a control experiment, embedding stitchup (E-Stitchup), and soft embedding stitchup ("soft E-Stitchup) (according to implementations of the disclosed subject matter.
Figure 5A:
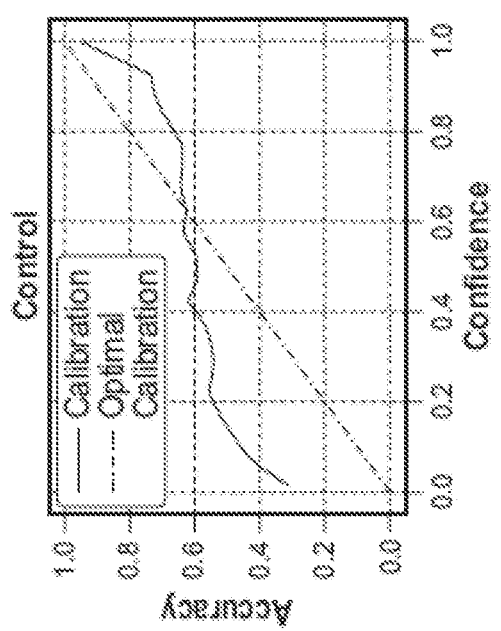
Figure 5C:
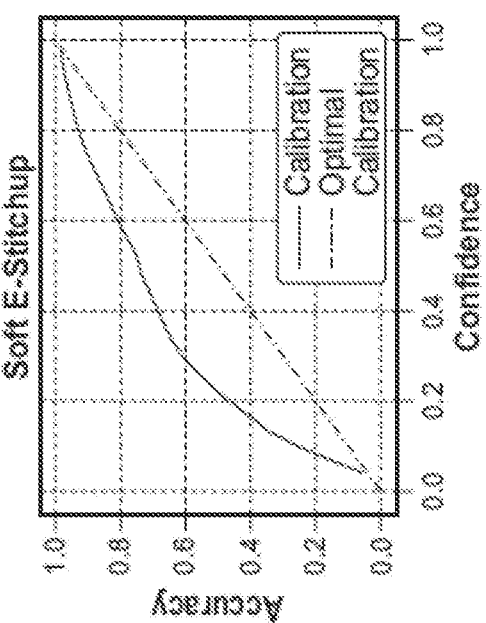

Embedding stitchup and soft embedding stitchup may improve the confidence calibration of resulting models. Embedding stitchup may yield a higher performance that embedding mixup both in classification performance and model calibration. As shown in Table 2 below, models trained with E-Stitchup achieve a confidence-accuracy correlation of 0.9860, which is the highest recorded correlation of any experiment, while models trained with Soft E-Stitchup yield a correlation of 0.9472. The improved calibration of models trained with E-Stitchup is shown in FIGS. 5A-5C. Reliability diagrams for models trained in the control experiment (FIG. 5A), embedding stitchup (E-Stitchup, FIG. 5B), and soft embedding stitchup (Soft E-Stitchup, FIG. 5C). The accuracy and confidence metrics presented in these reliability diagrams may be averaged across all trials of each experiment.

E-Stitchup may yield a higher performance than E-Mixup, both in classification performance and model calibration. Performing embedding mixup on data makes adaptations to the traditional mixup method to improve performance. Sampling embedding values may yield better performance than interpolating between them.

Table 2 shows confidence-accuracy correlation for models trained with each of the possible embedding augmentation methods, and the control experiment. These metrics highlight the improved calibration of models trained with embedding augmentation.

TABLE 2

| Augmentation Method | Confidence-Accuracy Correlation |
| --- | --- |
| Control | 0.9072 |
| Soft Control | 0.9292 |
| E-Mixup | 0.9789 |
| E-Stitchup | 0.9860 |
| Soft E-Mixup | 0.9236 |
| Soft E-Stitchup | 0.9472 |

As shown in Table 2, embedding stitchup may provide the highest accuracy-confidence correlation for all methods of 0.9860, as compared to a correlation of 0.9072 for the control. Models trained with soft embedding stitchup may yield a correlation of 0.9472, which may be an improvement over the correlation achieved with soft embedding mixup.

As shown in Table 1 above, the augmentation types improve the validation performance of resulting models, and provide a balance of overall and "none" category accuracy. From the provided AUROC and AUPR results, embedding stitchup may improve a downstream model's classification performance, as they yield the highest AUROC and AUPR scores, respectively. Augmentation types that include label softening appear to produce higher AUROC and AUPR scores than those that do not. That is, label softening may improve classification performance.

Figure 7:
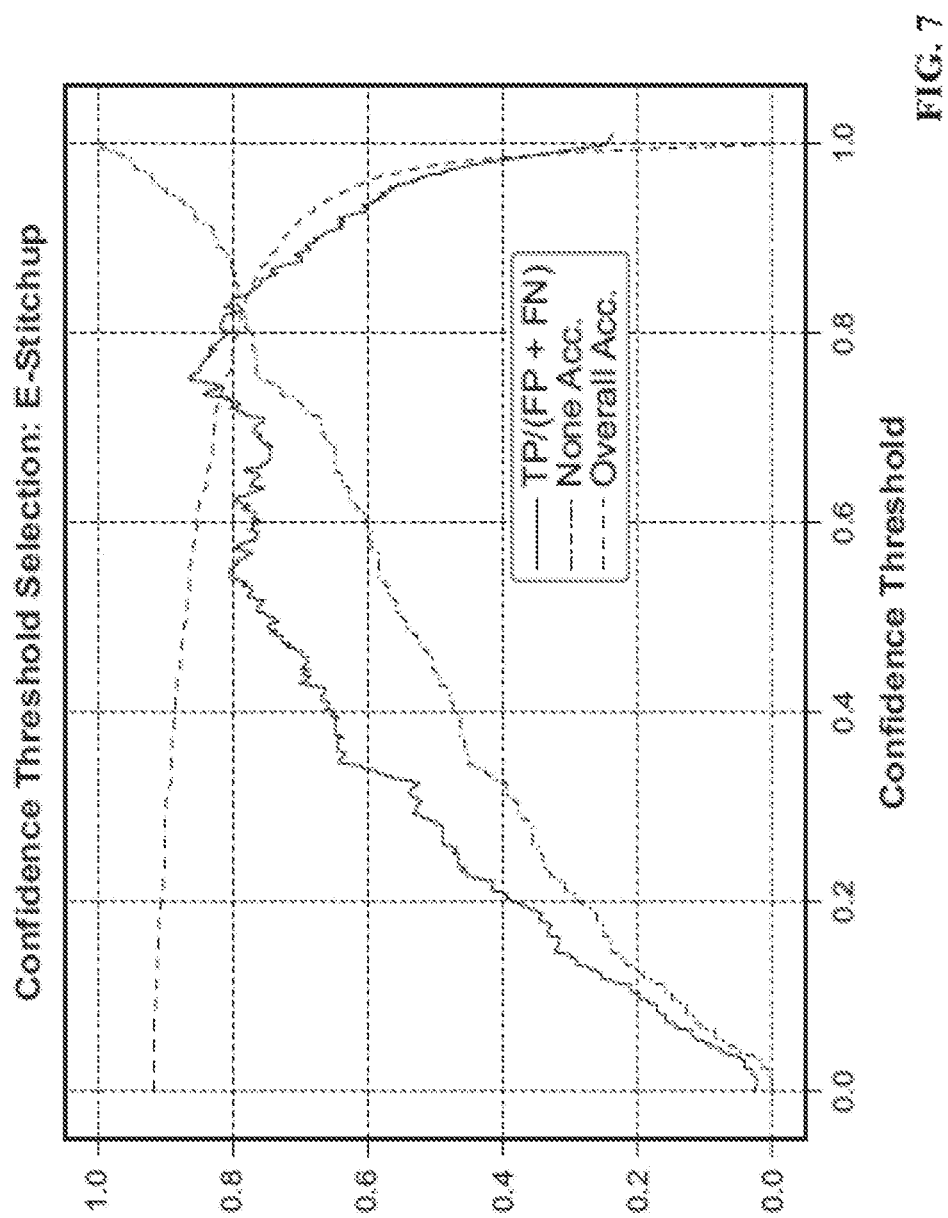
FIG. 7 shows a confidence threshold for embedding stitchup according to an implementation of the disclosed subject matter.

A value for the confidence threshold may be chosen to increase performance. As shown in FIG. 7, two heuristics may estimate an optimal confidence threshold. The heuristics may use a small validation set that contains OOD data. For example, the validation set may be formed by creating a 70-30 split for training and validation data, and choosing five random product categories to be fully removed from the training set. This may provide the existence of the "none" category products in the validation set. The model's predictions on this validation set may be used to estimate a confidence threshold value that improves performance.

The first heuristic may find the intersection between overall and "none" category accuracy, represented by the "Overall Acc." (i.e., overall accuracy) And "None Acc." (i.e., accuracy of the "none" category) curves shown in FIG. 7, which, in the provided example, may occur at a threshold of 0.8. The second heuristic may plot the ratio between true positive predictions and the sum of false positive and false negative predictions. This ratio may computed separately for the "none" category and ID categories so that the "none" category can be equally weighted. The optimal confidence threshold can then be determined by finding the maximum value of this ratio, which, as shown in FIG. 7, occurs at 0.77. Although these heuristics may yield slightly different confidence threshold estimates, their accuracy is generally robust to the size of the validation set, which may allow an optimal confidence threshold to be estimated consistently.

TABLE 3

| Method | Thresh. | ID Acc. | None Acc. | Acc. |
| --- | --- | --- | --- | --- |
| Control | 0.93 | 0.82 | 0.72 | 0.82 |
| S. Control | 0.50 | 0.80 | 0.75 | 0.80 |
| E-Mixup | 0.70 | 0.79 | 0.75 | 0.79 |
| E-Stitchup | 0.78 | 0.78 | 0.77 | 0.78 |
| S. E-Mixup | 0.52 | 0.75 | 0.80 | 0.75 |
| S. E-Stitchup | 0.58 | 0.76 | 0.79 | 0.76 |

The performance of each method after its optimal confidence threshold may be chosen using the heuristics defined above is shown in Table 3. At the optimal confidence threshold, E-Stitchup may achieve the best balance between overall and "none" category accuracy. In certain cases, however, methods that seem to perform higher in "none" accuracy, such as Soft E-Mixup, or ID accuracy, such as the control, may be preferred.

From the results shown in Table 1 above, embedding augmentation may provide improved classification performance. E-Stitchup may provide models with the best performance, but adding extra label softening (e.g., Soft E-Stitchup) may improves classification performance in terms of AUROC and AUPR. The accuracy metrics provided for each of the experiments in Table 3 show that the control experiments may be competitive with embedding augmentation methods. The AUROC and AUPR measures, which may provide an unbiased view of classification performance, show an improvement in classification performance using embedding augmentation, especially when extra label softening is added. Embedding augmentation may reduce the number of epochs before convergence, as shown in FIG. 6.

Models trained with embedding augmentation may provide a smooth tradeoff in "none" category and ID accuracy across different confidence thresholds (see, e.g., FIGS. 4A-4C). In the control, models may favor overall accuracy and may yield low "none" category accuracy across the confidence thresholds.

Model performance may change rapidly at a threshold of 0.98 because the majority of the control model's predictions are of high confidence. Such changes in accuracy across minimal changes in confidence threshold may highlight the volatility of the control model's performance. Because the control may favor ID accuracy over "none" category accuracy at most confidence thresholds, it may be difficult to select a confidence threshold for the control that prioritizes "none" category accuracy. No such issues arise in models trained with embedding augmentation, which may yield classification behavior resembling that shown in FIGS. 4A-4C for normal and softened embedding augmentation methods, respectively. Models trained with embedding augmentation may have a stable balance between performance on ID products and "none" category products, and may be capable of sacrificing ID accuracy to achieve higher levels of "none" category accuracy. Such a wider scope of performance possibilities, which may not be achieved in the control, may be useful in accurately identifying OOD data or data that a model does not understand well.

In the embedding augmentation types described above, models trained with softened embedding augmentation may achieve an intersection of ID and "none" category accuracy at a lower confidence threshold compared to those trained with normal embedding augmentation (see FIGS. 4A-4C). This intersection may be at a decreased confidence threshold, which may provide an even wider scope of "none" and ID accuracies to be obtained and may demonstrate the impact of label softening in regularizing the confidence of model predictions. E-Stitchup may have performance improvements in comparison to E-Mixup. Deep learning models trained with embedding input may perform better when the values within these embeddings are preserved, instead of interpolated.

Figure 8:
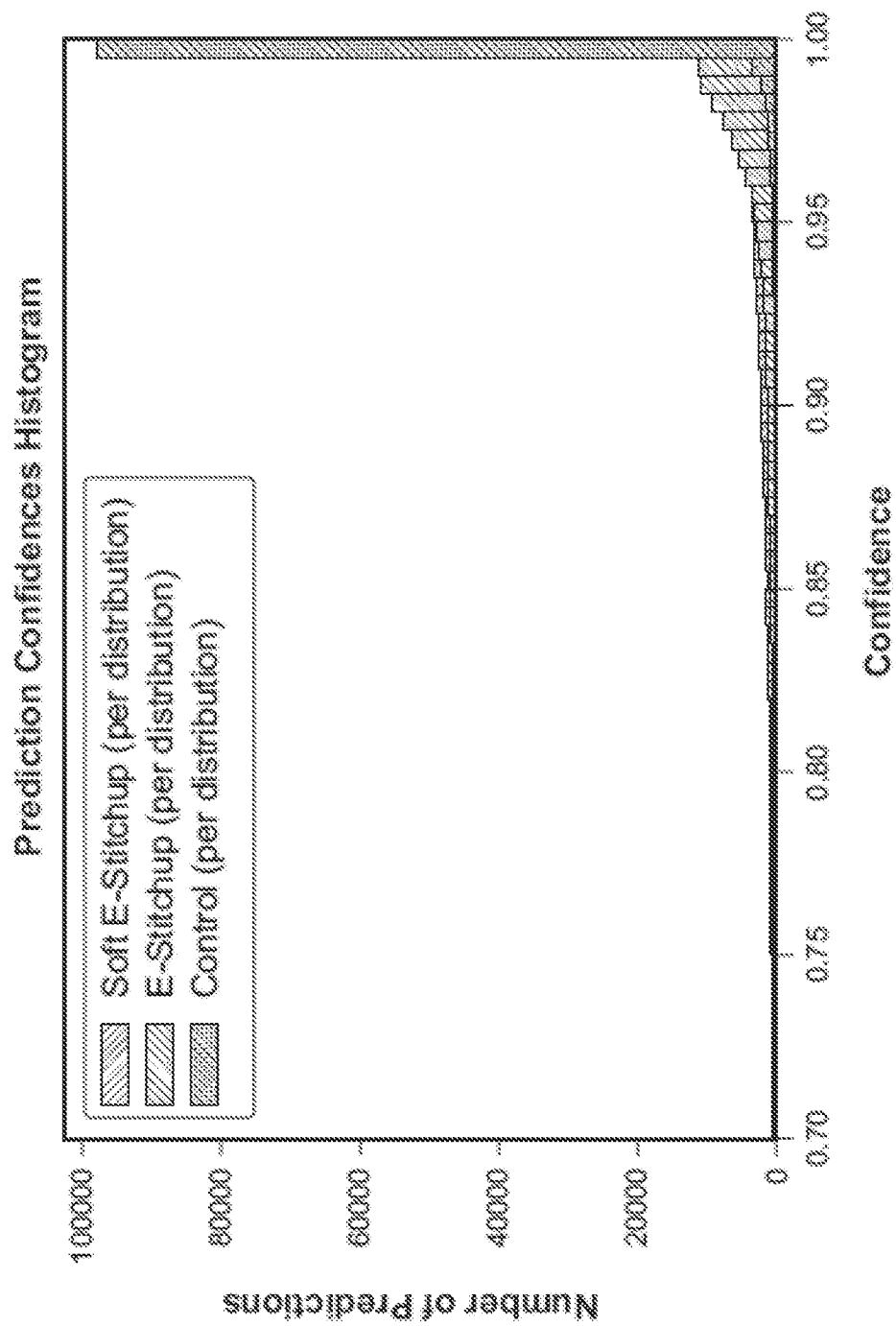
FIG. 8 shows a histogram with a frequency of predictions at difference confidences according to an implementation of the disclosed subject matter.

The model trained without any embedding augmentation may show symptoms of severe overconfidence that damage its performance. As shown in FIG. 8, almost all predictions made by the control model may be of high confidence. Such overconfidence may lead to the volatile performance of the control model shown in FIGS. 4A-4C, which may cause ID and "none" category accuracy to shift rapidly at a confidence threshold of 0.98. Overconfidence may be common for models trained with one-hot labels because small errors in confidence (i.e., a prediction of confidence 0.95 instead of 1.0) may dominate the gradient during training, and lead a model to produce peaked output distributions. As shown in FIG. 8, embedding augmentation, which may eliminate one-hot labels, may regularize overconfidence, causing model predictions to no longer be clustered at high confidence. Label softening, when combined with embedding augmentation, may lead to a wider distribution of prediction confidences, which may eliminate issues with overconfidence that are seen in the control model.

Models trained with embedding augmentation may have improved confidence calibration (see Table 2 above). As shown in FIGS. 5A-5C, the accuracy in the reliability diagram of the control model may be nearly constant across all confidence levels and peaks at high confidence, again highlighting the control model's issues with overconfidence. In contrast, models trained with embedding augmentation may demonstrate a direct relationship between accuracy and confidence, achieving calibration that is much closer to optimal. This direct relationship may be confirmed by the confidence-accuracy correlation of models trained with embedding augmentation, which may exceed the correlation values of control experiments. Adding label softening to embed-ding augmentation may provide decreased model calibration, despite improving classification performance. As shown in FIGS. 5A-5C, such decreased calibration relative to other augmentation methods may be caused by model underconfidence (i.e., accuracy of model predictions exceeds their associated confidence), thus further highlighting the effect of label softening on regularizing model confidence. The increased calibration of models trained with embedding augmentation may be useful, as it allows network confidence values to be interpreted, and may lead to improved OOD data detection.

To achieve improved model calibration, E-Stitchup may be used during training, as it may yield the best correlation between model confidence and accuracy (see Table 2). Classification performance may be further optimized at the cost of lower confidence calibration by using Soft E-Stitchup, or even the control. The control experiments, both with and without label softening, may achieve relatively competitive accuracy in comparison to embedding augmentation experiments, but may have overconfidence and reduced confidence calibration.

The augmentation disclosed throughout may improve classification performance, boost model calibration, improve OOD data identification, and/or reduce training time. After training an initial model with embedding augmentation, OOD and low-confidence data may be identified so that labeling efforts are focused on data that, if labeled and included in the model's training set, has a high likelihood of improving model performance. As discussed above, models trained with embedding augmentation may converge quickly, allowing them to be retrained at a low computational cost. With the use of embedding augmentation, models that perform poorly may be dynamically identified and labeled, including such data in the model's training set, and the model may be retrained. This iterative process may improve model performance on new and unknown data, which makes it useful in active learning scenarios (i.e., when new classes of data are being continually introduced) that are common in production-level deep learning settings.

Several variants of data augmentation may be developed for pre-trained embeddings. The proposed methods are generally applicable to embedding representations of data, making them useful in numerous domains (e.g., computer vision, natural language processing, speech processing, and the like). E-Stitchup may be the most useful embedding augmentation technique. By using the proposed heuristics to select a confidence threshold, E-Stitchup may achieve high in-distribution and "none" category accuracy. Models trained without embedding augmentation (i.e., the standard approach) may struggle to achieve such a stable balance between these metrics because they suffer from poor calibration and overconfidence, causing them to favor in-distribution accuracy over "none" category accuracy. By using, for example, E-Stitchup during training, the resulting model may have improved classification performance, may no longer suffer from overconfidence, may have highly-calibrated output, and may converge in half the number of epochs in comparison to a model trained without E-Stitchup. The augmentation methods disclosed herein for pre-trained embeddings may improving the performance of downstream deep learning models that use pre-trained embeddings as input, while adding minimal extra cost into the training process.

Embedding augmentation may be useful in a production-level deep learning system. An initially small data set of elements may be labeled for a desired task (e.g., the experiment described above used a training set containing 4,500 classification samples) and training a downstream model on such data. Due to the improved calibration of this resulting model, OOD and low-confidence data may be identified by examining the output distributions of the model and use such information to find data that, if labeled, may have a high probability of improving the model's performance. By identifying OOD and low-confidence data, time spent labeling may be focused on data that will lead to improvements in model performance instead of randomly sampling data for labeling, thus decreasing the amount of time required to create a workable dataset. Down-stream models may be trained with embedding augmentation to converge quickly. Data on which the model may perform poorly (i.e., OOD or low-confidence data), include such in the model's training set, may be identified and labeled. The model may be retrained to improve the performance of a deep learning model in an active learning scenario.

The systems and methods discussed throughout may effectively boost validation performance of the deep classification model by improving both the validation accuracy of the model as well as its ability to identify data belonging to unseen classes (i.e., the "none" category). These systems and methods may provide faster convergence for downstream models, resulting in improved confidence calibration for downstream models, may be used for any type of embedding representation of data, and do not require any fine-tuning of larger transfer learning models. The systems and methods discussed throughout may improve deep transfer learning with embeddings, increasing the calibration of model confidences to more easily identify OOD data, and may use confidence calibration to effectively label useful data and retrain models in an active learning scenario.

As discussed throughout, new types of data augmentation are presented: embedding mixup, embedding stitchup, soft embedding mixup, and soft embedding stitchup. Because these embedding augmentation methods are generally applicable to embedding representations, they may be applied to embeddings produced by many different types of data, including both textual and image data. Each of these augmentation methods may be evaluated in terms of validation performance, confidence calibration, and the ability of identify OOD data (i.e., data in the "none" category). The proposed systems and methods may increase validation performance and "none" category accuracy when compared to a model that does not use any embedding augmentation during training. Embedding augmentation may provide increased performance benefits by increasing the speed of training downstream models and improving the confidence calibration for downstream models, thus allowing for model outputs to be interpreted intuitively and OOD data to be identified by applying thresholds directly to model outputs (e.g., the confidence threshold). The proposed systems and methods may provide benefits in transfer learning, as they allow unseen classes of data to be accurately identified, thus highlighting data to be labeled and included in the training set of the model. The systems and methods may improve downstream model performance, including both classification performance and improved confidence calibration, without modifying any pre-trained networks. Implementations of the presently disclosed subject matter may be implemented in and used with a variety of component and network architectures. FIG. 9 is an example computer 500 suitable for implementing implementations of the presently disclosed subject matter. As discussed in further detail herein, the computer 500 may be a single computer in a network of multiple computers. As shown in FIG. 9, the computer 500 may communicate with a central or distributed component 600 (e.g., server, cloud server, database, cluster, application server, neural network system, or the like).

The central component 600 may communicate with one or more other computers such as the second computer 700, which may include a storage device 710. The second computer 700 may be a server, cloud server, neural network system, or the like. Central component 600 and/or the second computer 700 may perform vectorization, perform classification, create embeddings, perform augmentation, and the like. The storage 710 may use any suitable combination of any suitable volatile and non-volatile physical storage mediums, including, for example, hard disk drives, solid state drives, optical media, flash memory, tape drives, registers, and random access memory, or the like, or any combination thereof In some implementations, the storage 710 may store the text data, image data, catalog information, product data, model data, classification data, and the like.

Figure 10:
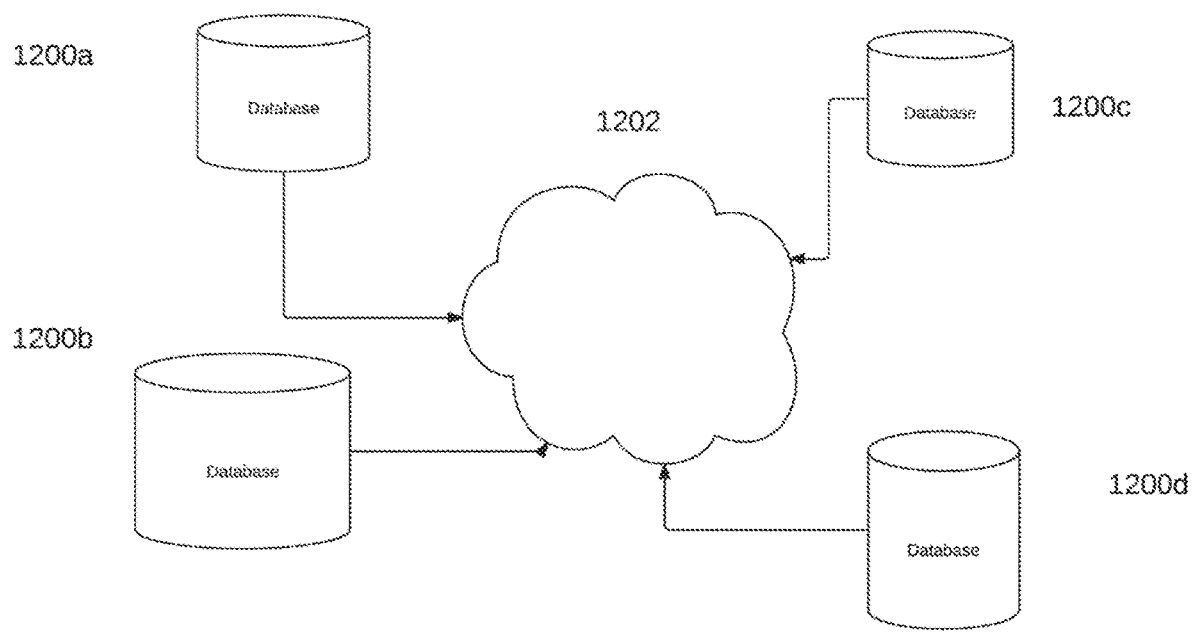
FIG. 10 shows a network configuration according to an implementation of the disclosed subject matter.

Further, if the systems shown in FIGS. 9-10 are multi-tenant systems, the storage can be organized into separate log structured merge trees for each instance of a database for a tenant. Different tenant may store different text data, image data, product catalog data, product data, label data, models, and the like. Alternatively, contents of all records on a particular server or system can be stored within a single log structured merge tree, in which case unique tenant identifiers associated with versions of records can be used to distinguish between data for each tenant as disclosed herein. More recent transactions can be stored at the highest or top level of the tree and older transactions can be stored at lower levels of the tree. Alternatively, the most recent transaction or version for each record (i.e., contents of each record) can be stored at the highest level of the tree and prior versions or prior transactions at lower levels of the tree.

The information obtained to and/or from a central component 600 can be isolated for each computer such that computer 500 cannot share information with computer 600 (e.g., for security and/or testing purposes). Alternatively, or in addition, computer 500 can communicate directly with the second computer 700.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks, as shown in FIGS. 9-10.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIGS. 9-10 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

FIG. 10 shows an example network arrangement according to an implementation of the disclosed subject matter. Four separate database systems 1200a-d at different nodes in the network represented by cloud 1202 communicate with each other through networking links 1204 and with users (not shown). The database systems 1200a-d may, for example, store text data, image data, catalog information, product data, models, classification data, and the like. In some implementations, the one or more of the database systems 1200a-d may be located in different geographic locations. Each of database systems 1200 can be operable to host multiple instances of a database, where each instance is accessible only to users associated with a particular tenant. Each of the database systems can constitute a cluster of computers along with a storage area network (not shown), load balancers and backup servers along with firewalls, other security systems, and authentication systems. Some of the instances at any of database systems 1200a-d may be live or production instances processing and committing transactions received from users and/or developers, and/or from computing elements (not shown) for receiving and providing data for storage in the instances.

One or more of the database systems 1200a-d may include at least one storage device, such as in FIG. 9. For example, the storage can include memory 570, fixed storage 530, removable media 550, and/or a storage device included with the central component 600 and/or the second computer 700. The tenant can have tenant data stored in an immutable storage of the at least one storage device associated with a tenant identifier. The tenant data may include, for example, catalog information, product data, machine learning model data, label data, and the like.

In some implementations, the one or more servers shown in FIGS. 9-10 can store the data in the immutable storage of the at least one storage device (e.g., a storage device associated with central component 600, the second computer 700, and/or the database systems 1200a-1200d) using a log-structured merge tree data structure.

The systems and methods of the disclosed subject matter can be for single tenancy and/or multitenancy systems. Multitenancy systems can allow various tenants, which can be, for example, developers, users, groups of users, and/or organizations, to access their own records (e.g., tenant data, replication configuration profiles, and the like) on the server system through software tools or instances on the server system that can be shared among the various tenants. The contents of records for each tenant can be part of a database containing that tenant. Contents of records for multiple tenants can all be stored together within the same database, but each tenant can only be able to access contents of records which belong to, or were created by, that tenant. This may allow a database system to enable multitenancy without having to store each tenants' contents of records separately, for example, on separate servers or server systems. The database for a tenant can be, for example, a relational database, hierarchical database, or any other suitable database type. All records stored on the server system can be stored in any suitable structure, including, for example, a log structured merge (LSM) tree.

Further, a multitenant system can have various tenant instances on server systems distributed throughout a network with a computing system at each node. The live or production database instance of each tenant may have its transactions processed at one computer system. The computing system for processing the transactions of that instance may also process transactions of other instances for other tenants.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "creating," averaging," "providing," "combining" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
generating, by a server, textual embeddings by tokenizing text data and generating vectors to be provided to a transformer system, wherein the textual embeddings are vector representations of semantic meanings of text that is part of the text data;
averaging, by the server, the vectors for every token of the generated textual embeddings and concatenating average output activations of two layers of the transformer system;
generating, by the server, image embeddings with a convolutional neural network (CNN) from image data, wherein the image embeddings are vector representations of the images that are part of the image data, by:
providing an original image to the CNN to retrieve activation maps at each layer of the CNN; and
using the activation maps, generating a resulting image embedding by performing a global average pooling on a convolutional layer of the CNN to determine a value for every channel; and
combining, by the server, the textual embeddings and image embeddings to form combined embeddings to be provided to the transformer system; and
transmitting, by the server, the combined embeddings.

2. The method of claim 1, further comprising:
applying, by the server, at least one of the group consisting of: weighted averaging, and weighted pooling to at least one of the textual embeddings and the image embeddings.

3. The method of claim 1, further comprising:
predicting, by the server, a ratio between at least two original product classes of an electronic catalog based on at least a portion of the combined embeddings provided to the transformer system.

4. The method of claim 1, further comprising:
applying, by the server, at least one data augmentation selected from the group consisting of: embedding mixup, embedding stitchup, embedding softened mixup, and embedding softened stitchup.

5. The method of claim 4, wherein the embedding mixup comprises:
generating, by the server, a weighted average of embedding inputs for two separate inputs selected from the group consisting of: the textual embeddings and the image embeddings.

6. The method of claim 4, wherein the embedding stitchup comprises:
generating, by the server, a combination of two unique training examples by randomly sample elements from two vectors of at least one from the group consisting of: the vectors of the text, and the vectors of the images.

7. The method of claim 6, wherein the embedding stitchup further comprises:
generating, by the server, a weighted average of two label vectors of the vectors of the text, wherein the label vectors are textual labels of items.

8. The method of claim 6, wherein the embedding stitchup randomly samples a ratio of each embedding.

9. The method of claim 4, wherein embedding softened mixup, or the embedding softened stitchup comprises:
generating, by the server, a weighted average of two target vectors of at least one from the group consisting of: the vectors of text, and the vectors of the images to generate a predicted soft target vector.

10. The method of claim 9, wherein the predicted soft target vector represents the ratio sampled from each of two input vectors for the transformer system, wherein the two input vectors are selected from the group consisting of: the vectors of text, and the vectors of the images.

11. The method of claim 10, further comprising:
randomly perturbing, by the server, values of the predicted soft target by subtracting a random value from one or more positive classes and adding a value to one or more negative classes.

12. The method of claim 11, wherein a total probability of one is spread across the one or more negative classes.

13. The method of claim 1, further comprising:
classifying, by the server, the combined embeddings.

14. The method of claim 1, wherein the combining the embeddings comprises:
concatenating, by the server, the textual embeddings and image embeddings with each other to create a single vector.

15. A system comprising:
a server having a processor and a memory to:
generate textual embeddings by tokenizing text data and generating vectors to be provided to a transformer system, wherein the textual embeddings are vector representations of semantic meanings of text that is part of the text data;
average the vectors for every token of the generated textual embeddings and concatenate average output activations of two layers of the transformer system;
generate image embeddings with a convolutional neural network (CNN) from image data, wherein the image embeddings are vector representations of the images that are part of the image data, by:
providing an original image to the CNN to retrieve activation maps at each layer of the CNN; and
using the activation maps to generate a resulting image embedding by performing a global average pooling on a convolutional layer of the CNN to determine a value for every channel; and
combine the textual embeddings and image embeddings to form combined embeddings to be provided to a transformer system; and
transmit the combined embeddings.

16. The system of claim 15, wherein the server applies at least one of the group consisting of: weighted averaging, and weighted pooling to at least one of the textual embeddings and the image embeddings.

17. The system of claim 15, wherein the server predicts a ratio between at least two original product classes of an electronic catalog based on at least a portion of the combined embeddings provided to the transformer system.

18. The system of claim 15, wherein the server applies at least one data augmentation selected from the group consisting of: embedding mixup, embedding stitchup, embedding softened mixup, and embedding softened stitchup.

19. The system of claim 18, wherein the server generates the embedding mixup by generating a weighted average of embedding inputs for two separate inputs selected from the group consisting of: the textual embeddings and the image embeddings.

20. The system of claim 18, wherein the server generates the embedding stitchup by generating a combination of two unique training examples by randomly sample elements from two vectors of at least one from the group consisting of: the vectors of the text, and the vectors of the images.

21. The system of claim 20, wherein the server generates the embedding stitchup by generating a weighted average of two label vectors of the vectors of the text, wherein the label vectors are textual labels of items.

22. The system of claim 20, wherein the embedding stitchup randomly samples a ratio of each embedding.

23. The system of claim 18, wherein server generates the embedding softened mixup or the embedding softened stitchup, by generating a weighted average of two target vectors of the output vectors to generate a predicted soft target vector.

24. The system of claim 23, wherein the predicted soft target vector represents the ratio sampled from each of two input vectors for the transformer system.

25. The system of claim 24, wherein the server randomly perturbs values of the predicted soft target by subtracting a random value from one or more positive classes and adding a value to one or more negative classes.

26. The system of claim 25, wherein a total probability of one is spread across the one or more negative classes.

27. The system of claim 15, wherein the server classifies the combined embeddings.

28. The system of claim 15, wherein the server combines the embeddings by concatenating the textual embeddings and image embeddings with each other to create a single vector.

* * * * *